United States Patent Office 3,448,891
Patented June 10, 1969

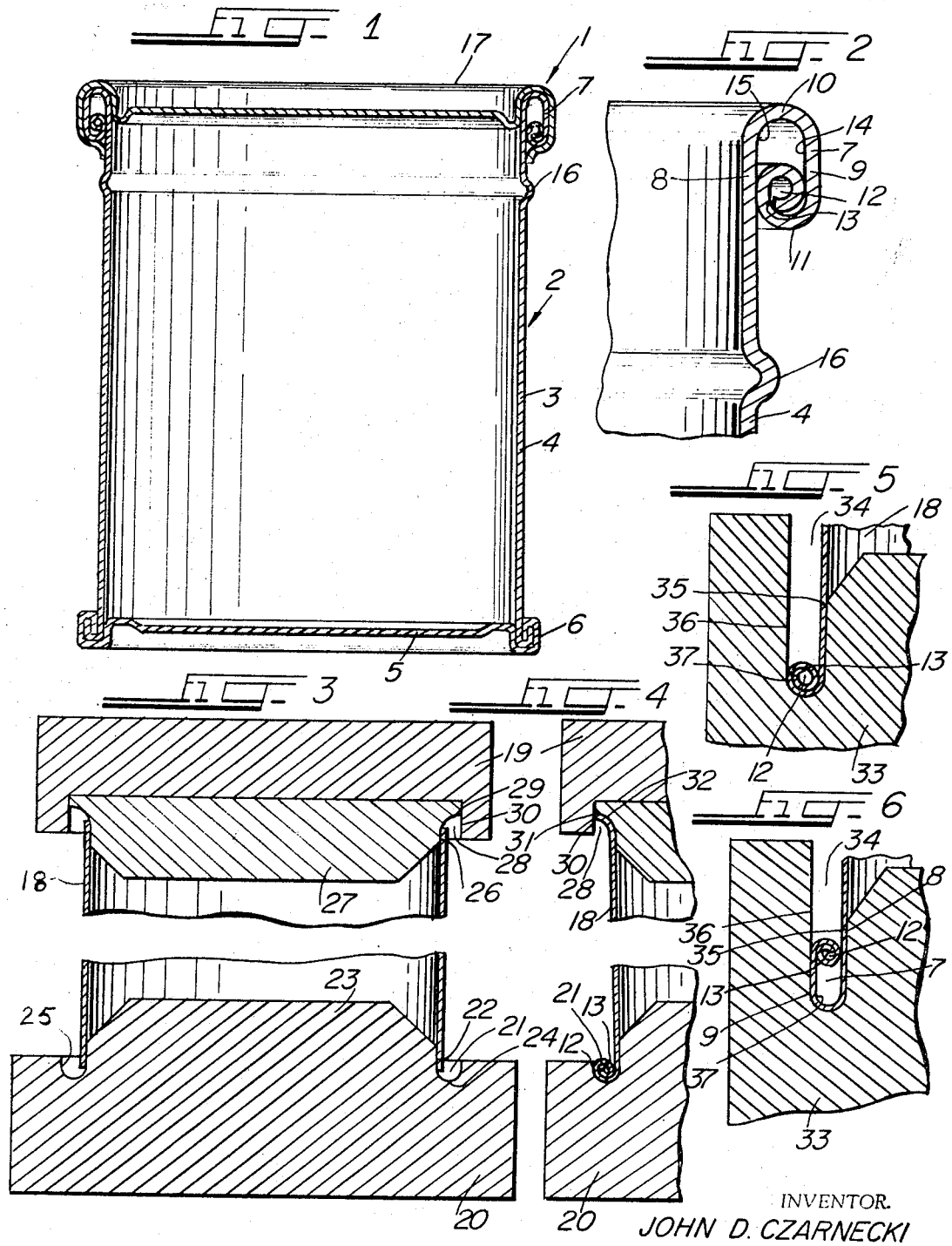

3,448,891
RECEPTACLES AND METHOD OF
MAKING SAME
John D. Czarnecki, Downers Grove, Ill., assignor to The
Sherwin-Williams Company, Cleveland, Ohio, a corporation of Ohio
Continuation-in-part of application Ser. No. 461,903,
June 7, 1965. This application Jan. 16, 1967, Ser.
No. 614,766
Int. Cl. B65d 7/34, 7/42
U.S. Cl. 220—74                                           8 Claims

ABSTRACT OF THE DISCLOSURE

A receptacle having curls disposed one within the other around the open end of the receptacle body, and method of making same.

---

The present application is a continuation-in-part of my copending application for United States Letters Patent Ser. No. 461,903, filed June 7, 1965.

This invention relates to receptacles and the method of making same, and more particularly, to the construction and method of making receptacles of the type which are particularly well adapted for use in containers for shipping various products such as paint and other liquids, coffee and other granulated materials, and the like.

It is a primary object of the present invention to afford a novel receptacle.

It is another important object to afford a novel method of manufacturing receptacles.

Yet another object is to afford a novel receptacle having parts thereof constituted and arranged in a novel and expeditious manner for according improved structural strength.

A further object is to enable a novel open-mouth container, having a removable lid, to be afforded.

Cans, having removable lids, for packaging and shipping various products have been heretofore known in the art. However, such cans have commonly had several inherent disadvantages. For example, paint cans of the type which have been commonly available on the market for years have embodied reinforcing ring members at the top thereof to afford the desierd structural strength. The insertion of such ring members into paint can bodies, and the like, normally requires a separate manufacturing operation. Also, such a ring member affords an inwardly projecting flange at the top of such a can, which makes it somewhat difficult to empty such a can completely. In addition such a ring member affords a ledge on which paint may accumulate when the cover is removed so that when the cover is again placed in closing relationship to the can body, it oftentimes tends to be come stuck thereto.

Attempts heretofore made to afford open-mouth cans, not having such internal ledges, or the like, for such purposes have commonly had the disadvantage of not affording a can having the necessary structural strength for shipping and storing purposes, or requiring that the can be made of such heavy material as not to be practical.

It is an important object of the present invention to overcome such disadvantages.

Another object is to enable a novel container to be afforded which embodies a minimum of separate parts.

Another object of the present invention is to afford a novel open-mouth receptacle having good structural strength, and which receptacle may be used as the body portion of a paint can, and the like.

Yet another object is to enable a novel and practical paint can, and the like, to be afforded, from which the entire contents thereof may be readily emptied.

A further object is to afford a novel open-mouth receptacle of the aforementioned type wherein the top edge portion thereof is constituted and arranged in a novel and expeditious manner effective to afford good structural strength against both axial and radial compression forces.

Another object is to afford a novel open-mouth receptacle of the aforementioned type embodying a novel curl construction on the upper edge thereof.

A further object is to afford a novel open-mouth receptacle of the aforementioned type which is practical in construction, and which may be readily and economically produced commercially.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

FIG. 1 is a longitudinal sectional view of a container embodying the principles of the present invention;

FIG. 2 is an enlarged, detail sectional view of a portion of the receptacle embodied in the container shown in FIG. 1;

FIG. 3 is a fragmentary sectional view through apparatus suitable for use in the making of a receptacle of the type shown in FIG. 1, in accordance with the novel method of making a receptacle, which forms a part of the present invention;

FIG. 4 is a fragmentary sectional view through the apparatus shown in FIG. 3, illustrating a later step in the method of making a receptacle;

FIG. 5 is a fragmentary sectional view of another piece of apparatus used in a subsequent step in the aforementioned method; and FIG. 6 is a view similar to FIG. 5, illustrating a still later step in the aforementioned method.

A container in the form of a can 1, which includes a receptacle 2 embodying the principles of the present invention is shown in FIGS. 1 and 2 of the drawings to illustrate the presently preferred embodiment of the present invention.

The receptacle 2 is of open-mouth construction, including a body portion 3 which is closed at the bottom and open at the top. The body portion 3 may be made of any suitable material such as, for example, a suitable sheet metal such as tin plate, and includes a tubular, substantially cylindrical-shaped side wall portion 4 and a bottom wall 5, FIG. 1. The bottom wall 5 may be secured to the lower edge of the side wall portion 4 by a rolled double seam 6, in the usual manner.

A substantially radially outwardly projecting curl 7 is afforded at the upper edge of the side wall portion 4 of the receptacle 2, FIGS. 1 and 2. The curl 7 is of a type herein referred to as an "open curl." That is, the parts thereof are so constituted and arranged that they define a passageway which extends around the periphery of the top of the receptacle 2, as distinguished from a tightly rolled curl or hemmed edge wherein the side walls thereof are disposed in intimate contact with each other.

The curl shown in FIGS. 1 and 2 of the drawings embodies two horizontally spaced, substantially parallel side wall portions 8 and 9, connected at their upper edges by a convex-upwardly arcuate-shaped top wall 10, with a bottom wall 11 extending between the lower edge portions of the side walls 8 and 9. The bottom wall 11 is bent back upon itself to afford, with the lower edge portion of the outer side wall portion 9, another open curl 12. The curl 12 is a 540° curl, the bottom wall 11 being bent back upon itself to such an extent that it engages the inner face 14 of the side wall portion 7, and then extends back toward the side wall portion 8, with the free end 13 of the bottom wall 11 terminating in directly facing engagement with the portion of the bottom wall 11 which faces the outer side wall portion 9. Preferably, the curl 12 is disposed in abutting engagement with the outer face 15 of the inner side wall portion 8, as shown in FIG. 2. In constructing a receptacle in accordance with the principles of the present invention, the arc of the curl 12 should exceed 360°, and preferably is 540° or a greater multiple of 180°.

Receptacles, such as, cans, and the like, have been heretofore known in the art wherein the upper edge portion thereof was bent over to afford "wired" edges, hems, and even open curls. Such formed edges of cans heretofore known in the art have had the advantage of eliminating the sharp edge which otherwise would be afforded by the top of a can, or the like, and have also added some structural strength to the cans, as compared to cans which did not have such folded-over edge portions. However, the folded-over edge portions of receptacles heretofore known in the art have not afforded the structural strength for the upper end portion thereof sufficient to enable the receptacles to afford practical body portions for cans for commercially packaging paint, and the like, from sheet metal of commercially practical gauge.

With the receptacle 2 constructed in the manner shown in FIGS. 1 and 2 of the drawings, the curl 7 affords a strong upper edge portion for the body portion 3. It has been found that with the receptacle 2 constructed of tin plate of the type commonly used for the construction of paint cans, and the like, and embodying the curl 7, the upper edge thereof has substantially greater compression strength, both axially and radially than receptacles having identically the same construction except that the upper edge thereof embodies a folded hem, a closed curl, or a plain open curl of 360°.

A bead in the form of a convex-outwardly annular rib 16 is preferably formed in the side wall portion 4 of the receptacle 2. Beads of this general type have been heretofore known in the can art. The bead 16 extends around the side wall portion 4 and is disposed in the upper end portion thereof in relatively closely adjacent, downwardly spaced relation to the curl 7. It serves the purpose of further increasing the resistance of the upper end portion of the receptacle 2 to radial compression.

In FIG. 1 of the drawings, the container 1 is shown embodying a cover member 17 disposed on the upper end of the receptacle 2 for closing the latter. However, as will be appreciated by those skilled in the art the particular cover member 17 is shown merely by way of illustration and not by way of limitation, and any suitable type of cover may be embodied in the container 1.

As is best shown in FIG. 2, the curl 7 has substantial horizontal thickness, but the vertical width thereof is several times greater than the horizontal thickness thereof, with the curl 12 spaced from the top wall 10 a major fraction of the vertical width of the curl 7. Preferably, the thickness of the curl 7 is such that the space between the inner wall 8 and the outer wall 9 is several times the thickness of the metal from which the side wall 4 is constructed. For example, with the side wall 4 constructed of metal having a thickness of one-hundredth of an inch, the space between the inner side wall portion 8 and the outer side wall portion 9 is preferably of the order of one-tenth to twelve-hundredths of an inch.

With the receptacle 2 constructed in the aforementioned manner, as shown in FIGS. 1 and 2, a highly practical open-mouth container construction, having an unobstructed substantially smooth side wall inner surface, may be afforded. With such construction, the receptacle afforded thereby is well suited for use as the body portion for cans for shipping paint and other materials. Such containers may be readily emptied, and have good structural strength.

From the foregoing it will be seen that the present invention affords a novel open-mouth receptacle construction.

A method of forming the curl 7 on the side wall portion of the receptacle 2 in accordance with the principles of the present invention, are illustrated in FIGS. 3–6 of the drawings. In the practice of this method a tubular, substantially cylindrical shaped blank 18, made of suitable sheet material, such as, for example, the aforementioned aluminum or tin plate, may be mounted between two dies 19 and 20, which are movable toward and away from each other. The dies 19 and 20 may be embodied in any one of several suitable presses readily available on the market. Only the die portions of such presses are shown in the drawings hereof, because it is unnecessary for a proper understanding of the present invention to show the other portions of the presses, it being obvious to those skilled in the art how the dies should be mounted in, and actuated by the presses.

As shown in FIG. 3, at the start of a forming operation the one edge of the blank 18 is disposed in an upwardly opening, annular groove 21 in the die 20, in snugly engaging relation to the annular inner side wall 22 of the groove 21 afforded by the vertical peripheral outer surface of a central body portion 23 of the die 20. The groove 21 has an arcuate bottom wall 24, which extends from the lower edge of the blank 18 to a vertical outer side wall portion 25, disposed in outwardly spaced, parallel relation to the inner side wall 22.

The other end of the blank 18 is similarly disposed in a downwardly opening, annular groove 28 in the die 19, in snugly fitting engagement with the vertical inner side wall 26 thereof afforded by the outer periphery of a central body portion 27 of the die 19. The groove 28 has an arcuate top wall 29 which curves outwardly from the side wall 26 into horizontally outwardly extending position, and terminates at its outer edge in engagement with an outer side wall 30 of the groove 28, which is disposed in outwardly spaced parallel relation to the side wall portion 26.

After the blank 18 has been thus disposed in the grooves 21 and 28, the dies 19 and 20 may be moved together into position wherein the edge of the blank 18 disposed in the groove 21 is caused to move successively along the wall portions 22, 24 and 25 of the groove 21, a sufficient distance to cause the 540° curl 12 to be formed on the blank 18, FIG. 4. During this same movement of the dies 19 and 20 toward each other, the other end portion of the blank 18 moves successively along the side wall 26 and top wall 29 of the groove 28 into position wherein the end edge 31 thereof moves into engagement with the outer wall 30 of the groove 28, to thereby form an arcuate, horizontally outwardly projecting flange 32 on this end of the blank 18, FIG. 4.

Thereafter the dies 19 and 20 may be separated and the blank 18 removed therefrom. The blank 18, with the flange 32 and the curl 12 formed thereon may then be installed in another press embodying a die identical to the die 19, shown in FIGS. 3 and 4, and a die such as the die 33, shown in FIG. 5, the die 33 merely replacing the die 20 insofar as the method of opertaion hereof is concerned.

The die 33 embodies an upwardly opening, annular groove 34 having a vertical inner side wall 35 and a vertical outer side wall 36 connected to each other by an arcuate bottom wall 37, FIG. 5. The blank 18 is so mounted in the die 33 that it is disposed around the side wall portion 35 in snugly fitting relation thereto. The radius of the arc of the bottom wall 37 of the groove 34 is sufficiently greater than that of the curl 12 that when the blank 18 is initially disposed in the die 33 with the curl 12 bottomed on the bottom wall 37, the outer side wall 36 of the groove 34 is spaced outwardly from the curl 12, FIG. 5.

Thereafter, the die 33 and the new die, not shown, engaging the other end of the blank 18, may be brought together a sufficient distance to cause the curl 12 on the blank 18 first to move outwardly along the bottom wall 37 of the groove 34 and then upwardly along the side wall 36 into the position shown in FIG. 6. Such relative movement of the blank 18 and the die 33 is sufficient to form the curl 7, the side walls 35 and 36 of the groove 34 being so spaced from each other that, as the curl 12 moves upwardly along the side wall 36, it is presented into engagement with the outer face of the body portion of the blank 18 disposed around the side wall 35, and the portion of the blank 18 between the curl 12 and the bottom wall 37 of the groove 34 is shaped to form the substantially flat, parallel inner wall 8 and outer wall 9 of the curl 7. During this latter forming operation, wherein the curl 7 is formed on the blank 18, the flange 32 is not further deformed, it being of such strength, and being so disposed in the aforementioned die corresponding to the die 19, that it will withstand the force applied thereto during the forming of the curl 7, without further deformation of the flange 32.

After the curl 7 is thus formed on the blank 18, the blank 18 may be removed from the die 33 and the aforementioned other die, not sown, and the rib 16 may be formed in the blank 18 by suitable means such as, for example, by a suitable rolling operation, to thereby complete the forming of the side wall portion 4 of the receptacle 2. Thereafter, the bottom wall 5 may be mounted on the flange 32, and the flange 32 and the peripheral edge of the bottom wall 5 may be secured together in the double seam 6, FIG. 1, by a suitable rolling operation to thereby complete the receptacle 2. Thereafter, a cover, such as, for example, the cover 17, may be mounted on the upper end of the body member 2 to afford the closed container 1.

As a practical matter, in the manufacture of the container 1, and particularly when the cover member 17 is to be sealed to the body portion 2 in airtight or liquid-tight relation thereto, the cover member 17 will often be sealed in operative position to the upper end portion of the side wall portion 4 prior to the mounting of the bottom wall 5 thereon. Under such conditions, after the cover member 17 has thus been mounted on the side wall portion 4, the material to be packaged may be placed in the container afforded by the side wall portion 4 and the cover 17, and the bottom wall 5 may thereafter be sealed to the side wall portion 4 in the usual matter. As will be appreciated by those skilled in the art, this procedure of closing the container 1 by sealing the bottom wall 5 to the side wall portion 4 as the last step in the operation is commonly accepted procedure in the art.

From the foregoing it will be seen that the present invention affords a novel method of making an open-mouth container.

Also, it will be seen that the present invention enables an open-mouth receptacle to be constructed in a novel and expeditious manner effective to afford a practical receptacle having the requisite structural strength for use as a body portion for paint cans, and the like.

In addition, it will be seen that the present invention affords a novel receptacle which is practical, and which may be readily and economically produced commercially.

Thus, while I have illustrated and described the preferred embodiments of my invention, it is to be understood that these are capable of variation and modification, and I, therefore, do not wish to be limited to the precise details set forth, but desire to avail myself of such changes and alterations as fall within the purview of the following claims.

I claim:
1. A receptacle comprising
 (a) a body portion having
  (1) a closed bottom and
  (2) an open top,
 (b) said body portion having an outwardly projecting curl at the upper edge thereof,
 (c) said curl
  (1) having two horizontally spaced side wall portions, and
  (2) being wider vertically than horizontally,
 (d) the lower edge of one of said side wall portions terminating in an edge portion which extends
  (1) into engagement with the other of said side wall portions,
  (2) then back toward said one side wall portion, and
  (3) then extends back toward said other side wall portion from said one side wall portion, and
  (4) terminates in engagement with a face of said edge portion remote from said other side wall portion.
2. A receptacle comprising
 (a) a tubular side wall portion having
  (1) a bottom and
  (2) a top, and
 (b) means closing the bottom of said side wall portion,
 (c) said side wall portion terminating at its top in an outwardly projecting open curl,
 (d) said curl having an inner side wall portion and an outer side wall portion horizontally spaced from each other,
 (e) said curl being wider vertically than horizontally, and
 (f) said outer side wall portion terminating at its lower edge in another open curl of more than 360° disposed in engagement with said inner side wall portion.
3. A receptacle as defined in claim 2, and in which
 (a) said inner and outer side wall portions are spaced from each other for a major portion of the vertical width of said first-mentioned curl.
4. A receptacle as defined in claim 2, and in which
 (a) said other curl is a 540° curl.
5. A receptacle comprising
 (a) a tubular side wall portion having
  (1) a bottom and
  (2) a top,
 (b) means mounted on said side wall portion in position to close said bottom,
 (c) said side wall portion having an upper edge terminating in an outwardly projecting open curl defining a passageway extending around the top of said wall portion,
 (d) said curl having
  (1) an upstanding inner side wall portion,
  (2) an upstanding outer side wall portion spaced horizontally outwardly from said inner side wall portion,
  (3) a top wall portion extending between said inner and outer side wall portions, and
  (4) a bottom wall portion spaced downwardly from said top wall portion and extending between said inner and outer side wall portions,
 (e) said bottom wall portion curling back upon itself in position to afford, with the lower edge portion of said outer side wall portion, a 540° open curl defining a passageway extending around the top portion of said first-mentioned side wall portion, and
 (f) said last-mentioned curl being disposed in engagement with said inner side wall portion.
6. A receptacle as defined in claim 5, and in which
 (a) said other curl is spaced from said top wall portion the major portion of the vertical width of said first-mentioned curl.

7. A receptacle as defined in claim 5, and in which
   (a) said first-mentioned side wall portion has an annular beam formed therein and extending therearound in downwardly spaced relation to said first-mentioned curl.

8. In a container for shipping products, and having closed upper and lower ends,
   (a) an elongated, tubular body portion extending between said ends,
   (b) said tubular body portion having an upper edge portion terminating in an outwardly projecting open curl,
   (c) said open curl being a plurality of times greater in vertical height than in horizontal thickness, and
   (d) said open curl terminating at its lower edge in another open curl of more than 360°,
   (e) said tubular body portion having an annular bead extending therearound in downwardly spaced relation to said curls, and
   (f) said bead being spaced from said curls a minor portion of the length of said body portion.

References Cited
UNITED STATES PATENTS

| | | | |
|---|---|---|---|
| 2,335,647 | 11/1943 | Chamberlain | 220—59 |
| 2,535,839 | 12/1950 | Coyle et al. | 220—67 |

JAMES B. MARBERT, *Primary Examiner.*